United States Patent
Baone et al.

(10) Patent No.: US 10,423,185 B2
(45) Date of Patent: Sep. 24, 2019

(54) SYSTEMS AND METHODS FOR REGULATING A MICROGRID

(71) Applicant: General Electric Company, Schenectady, NY (US)

(72) Inventors: Chaitanya Ashok Baone, Glenville, NY (US); Herman Lucas Norbert Wiegman, Niskayuna, NY (US); Naresh Acharya, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 15/220,749

(22) Filed: Jul. 27, 2016

(65) Prior Publication Data
US 2017/0322578 A1   Nov. 9, 2017

Related U.S. Application Data

(60) Provisional application No. 62/333,301, filed on May 9, 2016.

(51) Int. Cl.
*G05F 1/66* (2006.01)
*G05B 19/42* (2006.01)
(Continued)

(52) U.S. Cl.
CPC ............. *G05F 1/66* (2013.01); *G05B 19/042* (2013.01); *H02J 3/06* (2013.01); *H02J 3/38* (2013.01);
(Continued)

(58) Field of Classification Search
CPC ........ G05B 19/042; G05B 2219/40458; G05F 1/66; H02J 4/00
See application file for complete search history.

(56) References Cited

U.S. PATENT DOCUMENTS 5,708,590 A    1/1998   Slutsker et al.
8,019,697 B2   9/2011   Ozog
(Continued)

FOREIGN PATENT DOCUMENTS

EP    2738905 A2       6/2014
WO    2010119136 A1    10/2010
(Continued)

OTHER PUBLICATIONS

Bi et al., "Adaptive loss of field protection based on phasor measurements," Power and Energy Society General Meeting, 2011 IEEE, IEEE, Jul. 24, 2011 (Jul. 24, 2011), pp. 1-4.
(Continued)

*Primary Examiner* — Kenneth M Lo
*Assistant Examiner* — Mohammad A Rahman
(74) *Attorney, Agent, or Firm* — Armstrong Teasdale LLP

(57) ABSTRACT

A microgrid system includes one or more power generators configured to provide electrical energy. The microgrid system also includes a localized distribution network coupled to the one or more power generators, coupled to the one or more loads, and coupled to an external grid. The microgrid system further includes a microgrid controller configured to predict microgrid demand for the one or more loads for a predetermined period of time. The microgrid controller is also configured to receive demand information for the external grid for the predetermined period of time. The microgrid controller is further configured to determine an operation plan for the one or more power generators based on the predicted microgrid demand and the received demand information. Moreover, the microgrid controller is configured to determine a schedule to transmit electrical energy to the external grid based on the operation plan.

20 Claims, 6 Drawing Sheets

(51) Int. Cl.
*H02J 4/00* (2006.01)
*G05B 19/042* (2006.01)
*H02J 3/06* (2006.01)
*H02J 3/38* (2006.01)
*H02J 3/00* (2006.01)

(52) U.S. Cl.
CPC ...... *H02J 4/00* (2013.01); *G05B 2219/40458* (2013.01); *H02J 2003/003* (2013.01)

(56) References Cited

U.S. PATENT DOCUMENTS

| | | | |
|---|---|---|---|
| 8,076,802 | B2 | 12/2011 | Fornage |
| 8,364,609 | B2 | 1/2013 | Ozog |
| 8,401,709 | B2 | 3/2013 | Cherian et al. |
| 8,406,019 | B2 | 3/2013 | Garces et al. |
| 8,571,955 | B2 | 10/2013 | Al Faruque et al. |
| 8,583,520 | B1 | 11/2013 | Forbes, Jr. |
| 8,718,850 | B2 | 5/2014 | Bozchalui et al. |
| 8,862,279 | B2 | 10/2014 | Darden, II et al. |
| 8,886,362 | B2 | 11/2014 | Krok et al. |
| 9,026,259 | B2 | 5/2015 | Zadeh et al. |
| 2010/0217642 | A1 | 8/2010 | Crubtree et al. |
| 2010/0332373 | A1 | 12/2010 | Crabtree et al. |
| 2011/0082597 | A1 | 4/2011 | Meagher |
| 2011/0093127 | A1 | 4/2011 | Kaplan |
| 2013/0015703 | A1 | 1/2013 | Rouse et al. |
| 2013/0079939 | A1 | 3/2013 | Darden, II et al. |
| 2013/0079943 | A1 | 3/2013 | Darden, II et al. |
| 2014/0039709 | A1 | 2/2014 | Steven et al. |
| 2014/0097683 | A1 | 4/2014 | Piyabongkarn et al. |
| 2014/0129040 | A1 | 5/2014 | Emadi et al. |
| 2014/0330695 | A1 | 11/2014 | Steven et al. |
| 2014/0343983 | A1 | 11/2014 | Narayan et al. |
| 2015/0039145 | A1* | 2/2015 | Yang ................. H02J 3/00 700/291 |
| 2015/0088576 | A1 | 3/2015 | Steven et al. |
| 2015/0102669 | A1 | 4/2015 | Stewart |
| 2015/0127425 | A1 | 5/2015 | Greene et al. |
| 2015/0241893 | A1 | 8/2015 | Hajimiragha et al. |
| 2016/0043550 | A1* | 2/2016 | Sharma ................ H02J 3/00 705/7.35 |
| 2016/0305678 | A1* | 10/2016 | Pavlovski ............ G05B 13/048 |
| 2017/0293975 | A1* | 10/2017 | Saito .................... G05F 1/66 |

FOREIGN PATENT DOCUMENTS

| | | |
|---|---|---|
| WO | 2012106389 A2 | 8/2012 |
| WO | 2013087085 A1 | 6/2013 |
| WO | 2014018884 A1 | 1/2014 |
| WO | 2015164292 A1 | 10/2015 |

OTHER PUBLICATIONS

International Search Report and Written Opinion, dated Jan. 3, 2018, for related International application No. PCT/US2017/026833.

Saraiva J.T. et al.; "Provision of Some Ancillary Services by Microgrid Agents"; 7th International Conference on the European Energy Market, Jun. 23-25, 2010; Madrid, Spain; pp. 1-8.

Kueck, J.D. et al.; "Microgrid Energy Management System"; Oak Ridge National Laboratory, 2003.

Yuen, Chery et al.; "The Feasibility and Profitability of Ancillary Services Provision from Multi-MicroGrids"; Power Tech IEEE, Jul. 1-5, 2007; Lausanne, Switzerland; pp. 598-603.

Nguyen, Duong Tung et al.; "Optimal Bidding Strategy for Microgrids Considering Renewable Energy and Building Thermal Dynamics"; IEEE Transactions on Smart Grid, vol. 5, Issue 4; Jul. 2014; pp. 1608-1620.

Changsong, Chen et al.; "Energy Trading Model for Optimal Microgrid Scheduling Based on Genetic Algorithm"; Power Electronics and Motion Control Conference, May 2009; Wuhan, China; pp. 2136-2139.

Baone, C.A., et al., "Optimal Day-ahead Scheduling for Microgrid Participation in Frequency Regulation Markets," IEEE Power & Energy Society Innovative Smart Grid Technologies Conference, pp. 1-5 (2016).

International Search Report and Written Opinion issued in connection with corresponding PCT Application No. PCT/US2017/031739 dated Jun. 30, 2017.

Liu, Guodong et al.; Bidding Strategy for Microgrid in Day-Ahead Market Based on Hybrid Stochastic/Robust Optimization; IEEE Transactions on Smart Grid, vol. 7, Issue 1; Sep. 2015; pp. 227-237.

* cited by examiner

SYSTEMS AND METHODS FOR REGULATING A MICROGRID

CROSS REFERENCE TO RELATED APPLICATIONS

This application claims priority to U.S. Provisional Patent Application Ser. No. 62/333,301, filed May 9, 2016, the disclosure of which is hereby incorporated by reference in its entirety.

STATEMENT REGARDING FEDERALLY SPONSORED RESEARCH & DEVELOPMENT

This invention was made with Government support under contract number DE-0E0000728 awarded by the Department of Energy. The Government has certain rights in the invention.

BACKGROUND

The field of the invention relates generally to regulating a microgrid, and more specifically, to methods and a system for regulating a microgrid in view of demand from an external grid.

A microgrid is a group of interconnected loads and distributed energy resources (DER) with clearly defined electrical boundaries that act as a single controllable entity with respect to the grid and can connect and disconnect to the grid to enable the microgrid to operate in both grid-connected and island modes. As microgrid installations steadily grow in specific pockets in the United States and around the world, widespread adoption of commercial microgrids would primarily rely upon the economic benefit to the owners and operators. New market rules (e.g., New York and California) have been introduced that facilitate the aggregation of sub-metered assets and accelerated integration of DERs into the grid. Accordingly, there is an increasing need and incentive for facilitating distributed assets to participate in grid ancillary service functions, such as, frequency regulation.

Power system frequency is a major indicator of power balance in the power system. A decrease in power generation in relation to the demand or load may cause the frequency to drop below a nominal frequency. Similarly, a decrease in demand may cause the frequency to increase beyond the nominal frequency. Furthermore, high penetration of intermittent energy sources, such as wind turbines and solar arrays, increases the potential for variability in system frequency. If the frequency deviates too far from the nominal frequency, equipment like pumps and motors run faster at the higher frequencies or slower at the lower frequencies. Some equipment will automatically shut down to avoid operational difficulties and accelerated maintenance. For example, in the event of a sharp decline in relation to power fluctuations, under-frequency load shedding controllers may operate to disconnect some or all of the associated loads.

To facilitate a functional and reliable grid, the Independent System Operators (ISOs) that operate the various regional grids must maintain their electric frequency very close to 60 hertz (Hz), or cycles per second (50 Hz in certain countries). Grid operators, therefore, seek to continuously balance power generation with demand to maintain the proper frequency. The imbalance between power generation and demand can be mitigated by use of microgrid resources. However, there are many constraints in utilizing microgrid resources that must be considered, such as cost to operate equipment, time to ramp up or ramp down power generation, and availability of resources.

BRIEF DESCRIPTION

In one aspect, a microgrid system is provided. The microgrid system includes one or more power generators configured to provide electrical energy to one or more loads. The microgrid system also includes a localized distribution network coupled to the one or more power generators, coupled to the one or more loads, and coupled to an external grid. The localized distribution network is configured to transmit electrical energy. The microgrid system further includes a microgrid controller comprising a processor and a memory coupled to the processor. The microgrid controller is in communication with the one or more power generators and in communication with the external grid. The microgrid controller is configured to predict microgrid demand for the one or more loads for a predetermined period of time, receive demand information for the external grid for the predetermined period of time including pricing for frequency regulation services, determine an operation plan for the one or more power generators based on the predicted microgrid demand and the received demand information, and determine a schedule to transmit electrical energy to the external grid based on the operation plan.

In a further aspect, a computer-based method for regulating a microgrid is provided. The method is implemented using a microgrid controller including at least one processor in communication with a memory. The method includes predicting microgrid demand for one or more loads for a predetermined period of time, receiving demand information for an external grid for the predetermined period of time including pricing for frequency regulation services, determining an operation plan of one or more power generators based on the predicted microgrid demand and the received demand information, and determining a schedule to transmit electrical energy to the external grid based on the operation plan.

In another aspect, a computer-readable storage device having processor-executable instructions embodied thereon for regulating a microgrid is provided. When executed by a microgrid controller communicatively coupled to a memory, the processor-executable instructions cause the microgrid controller to predict microgrid demand for one or more loads for a predetermined period of time, receive demand information for an external grid for the predetermined period of time including pricing for frequency regulation services, determine an operation plan of one or more power generators based on the predicted microgrid demand and the received demand information, and determine a schedule to transmit electrical energy to the external grid based on the operation plan.

DRAWINGS

These and other features, aspects, and advantages of the present disclosure will become better understood when the following detailed description is read with reference to the accompanying drawings in which like characters represent like parts throughout the drawings, wherein.

Figure 1:
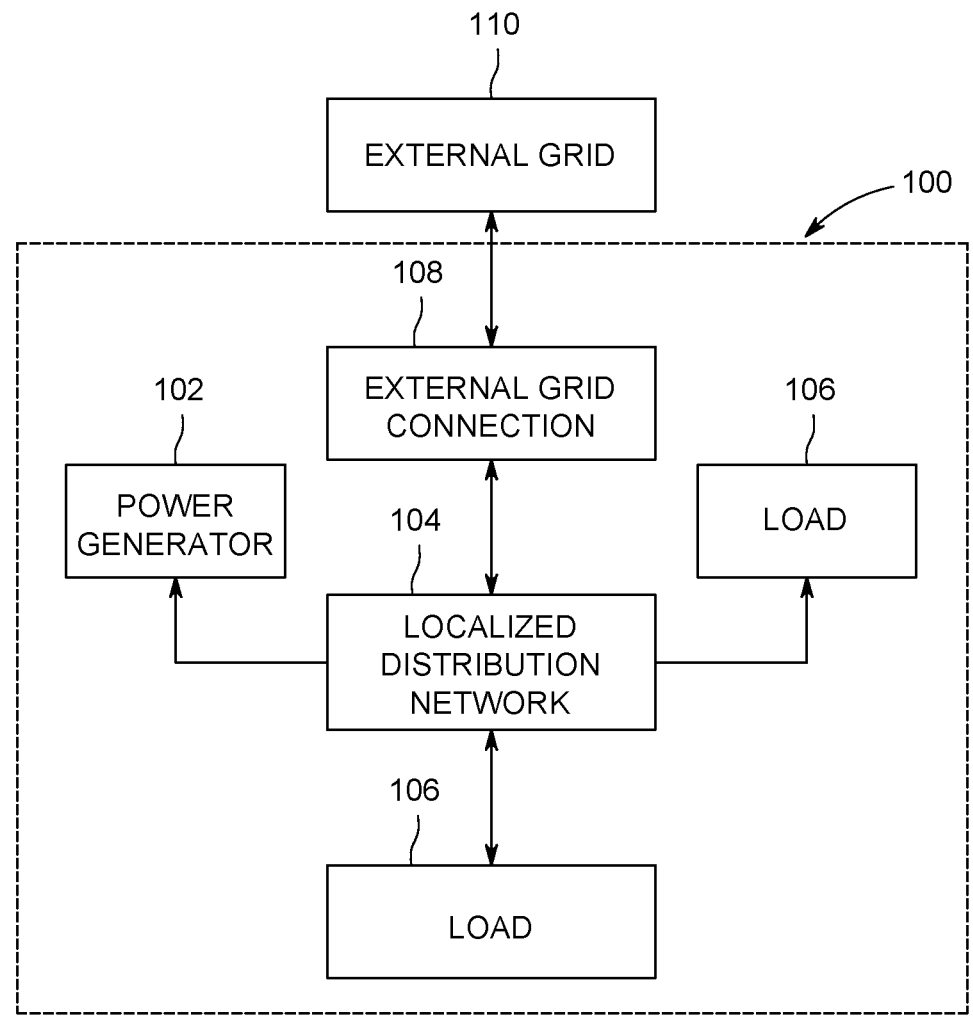
FIG. 1 is a schematic view of an exemplary microgrid utility system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The method and systems described herein provide for regulating a microgrid. Furthermore, the method and systems described herein facilitate improving the optimization of operation of the microgrid, while reducing costs and improving profitability. These methods and systems facilitate providing electrical energy and ancillary services to external power grids. Also, the system and methods described herein are not limited to any single type of system, utility, or power source, but may be implemented with any system or utility capable of contributing to an external power grid or utility system without being a directly controlled part of that utility. By predicting the future demand of loads on the local microgrid and those of external grids, the system and method described herein facilitates the operators of local microgrids providing the needed resources of both in an economical and efficient manner.

FIG. 1 is a schematic view of an exemplary microgrid utility system 100. While in the exemplary embodiment, microgrid utility system 100 is directed to the generation and delivery of electrical energy, other utility based resources, such as, but not limited to, gas and water, may be used with system 100 and methods described herein. In the exemplary embodiment, microgrid utility system 100 is configured as a smart grid system.

In the exemplary embodiment, microgrid utility system 100 includes at least one power generator 102. Examples of power generators 102 include non-renewable sources, such as, but are not limited to, diesel generators, combined heat/power (CHP) generators, battery energy storage, fuel cells, and electrolyzers. Additionally examples of power generators 102 include renewable sources, such as, but not limited to, wind turbines, geothermal pumps, solar cells, and hydroelectric plants. In the exemplary embodiment, power generator 102 transmits electrical power through localized distribution network 104. Localized distribution network 104 includes equipment, such as, without limitation, a plurality of conduits and switches that facilitate electrical energy being routed to its destination. In the exemplary embodiment, localized distribution network 104 is electrically connected to power generator 102, a plurality of loads 106, and an external grid 110 through an external grid connection 108. Examples of loads 106 include businesses and residences that consume electrical energy. In some embodiments, loads 106 are connected to localized distribution network 104 through a smart meter (not shown). In some embodiments, microgrid utility system 100 is also known as a local grid.

External grid 110 represents a separate regulated electrical grid. In some embodiments, external grid 110 is a regional grid. In other embodiments, external grid 110 is another microgrid utility system 100. External grid connection 108 facilitates microgrid utility system 100 receiving electrical energy from, or transmit electrical energy to, external grid 110. In some embodiments, microgrid utility system 100 may buy electrical energy from external grid 110. In these embodiments, microgrid utility system 100 may also sell excess electrical energy to external grid 110. In the exemplary embodiment, external grid connection 108 is a circuit breaker that may be opened to sever the connection between microgrid utility system 100 and external grid 110.

Figure 2:
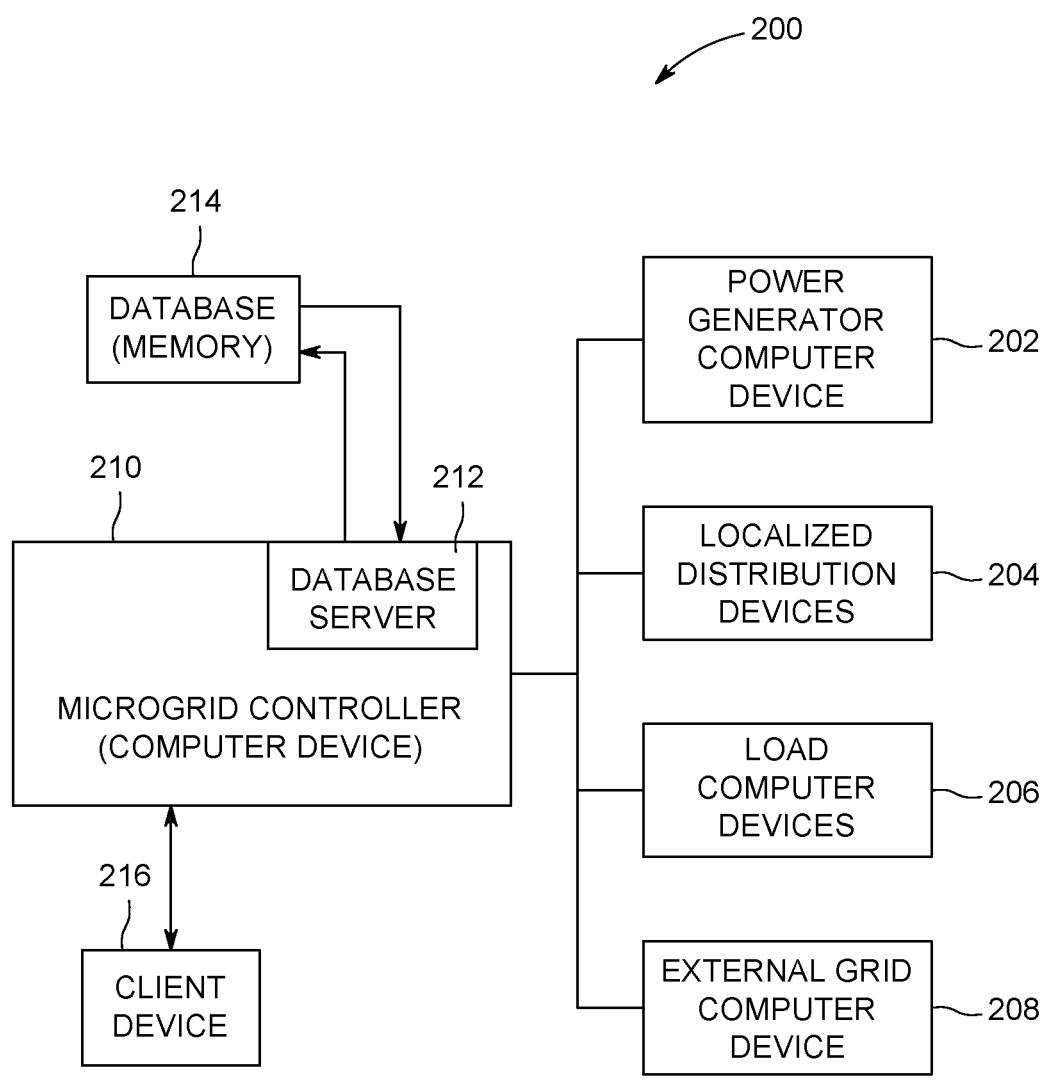
FIG. 2 is a schematic view of an exemplary system for regulating the microgrid utility system shown in FIG. 1.

FIG. 2 is a schematic view of an exemplary system 200 for regulating the microgrid utility system 100 (shown in FIG. 1). In the exemplary embodiment, system 200 is used for regulating the transmission of electrical energy over microgrid utility system 100, ensuring loads 106 (shown in FIG. 1) receive needed power, and using the connection to external grid 110 (shown in FIG. 1) to receive extra needed power or shed excess power. As described below in more detail, a microgrid computer device 210, also known as a microgrid controller 210, may be configured to (a) predict microgrid demand for the one or more loads 106 for a predetermined period of time; (b) receive demand information for external grid 110 for the predetermined period of time including pricing for frequency regulation services; (c) determine an operation plan for the one or more power generators 102 (shown in FIG. 1) based on the predicted microgrid demand and the received demand information; and (d) determine a schedule to transmit electrical energy to external grid 110 based on the operation plan.

In the exemplary embodiment, a power generator computer device 202 regulates the operation of power generator 102. Power generator computer device 202 is in communication with microgrid controller 210. Power generator computer device 202 couples to microgrid controller 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In some embodiments, power generator computer device 202 is in communication with microgrid controller 210 through localized distribution network 104 (shown in FIG. 1). In some embodiments, multiple power generators 102, each corresponding to a power generator computer device 202, are included in microgrid utility system 100. In other embodiments, microgrid utility system 100 includes a single power generator 102 and corresponding power generator computer device 202. In the exemplary embodiment, power generator computer device 202 receives instructions for the operation of power generator 102 from microgrid controller 210.

In the exemplary embodiment, localized distribution devices 204 control localized distribution network 104 and direct the routing of electrical energy from power generator 102 to loads 106 and external grid 110. Localized distribution devices 204 are in communication with microgrid controller 210. Localized distribution devices 204 couple to microgrid controller 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In the exemplary embodiment, localized distribution devices 204 receive instructions about routing electrical energy through localized distribution network 104 from microgrid controller 210.

In the exemplary embodiment, load computer devices 206 regulate and report on the operations of loads 106. Load computer devices 206 are in communication with microgrid controller 210. Load computer devices 206 couple to microgrid controller 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In some embodiments, load computer devices 206 are in communication with microgrid controller 210 through localized distribution network 104. In some embodiments, load computer device 206 is a smart meter. In the exemplary embodiment, each load computer device 206 corresponds to a load 106 and reports about the operation of load 106 to microgrid controller 210. In the exemplary embodiment, load computer device 206 transmits power usage information about load 106. In some embodiments, load computer device 206 transmits power usage information in real-time. In other embodiments, load computer device 206 transmits historical power usage information. In some further embodiments, load computer devices 206 transmit demand information about current or future power demands of the corresponding loads 106, such as predictions of future load demand based on historical information. Load computer device 206 may transmit more or less information as needed to enable system 200 to function as described herein.

In the exemplary embodiment, external grid computer devices 208 provide information about external grid 110, such as demand and pricing forecasting information. External grid computer devices 208 are in communication with microgrid controller 210. External grid computer devices 208 couple to microgrid controller 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In the exemplary embodiment, external grid computer device 208 transmits current and future pricing information as well as demand information for external grid 110. In some embodiments, external grid computer device 208 transmits information in real-time. In other embodiments, external grid computer device 208 transmits future forecasting information for a period of time. External grid computer device 208 may transmit more or less information as needed to enable system 200 to function as described herein.

A database server 212 is coupled to database 214, which contains information on a variety of matters, as described below in greater detail. In one embodiment, centralized database 214 is stored on microgrid controller 210. In an alternative embodiment, database 214 is stored remotely from microgrid controller 210 and may be non-centralized. In some embodiments, database 214 includes a single database having separated sections or partitions or in other embodiments, database 214 includes multiple databases, each being separate from each other. Database 214 stores data received from multiple load computer devices 206 and external grid computer device 208. In addition, and without limitation, database 214 stores pricing forecasts, demand forecasts, transmission constraints, energy generation constraints, and historical data from load computer devices 206, external grid computer device 208, and microgrid controller 210.

In some embodiments, microgrid controller 210 is in communication with a client device 216, also known as a client system 216. Microgrid controller 210 couples to client device 216 through many interfaces including, without limitation, localized distribution network 104, a network, such as a local area network (LAN) or a wide area network (WAN), dial-in-connections, cable modems, Internet connection, wireless, and special high-speed Integrated Services Digital Network (ISDN) lines. In these embodiments, microgrid controller 210 transmits data about the operation of microgrid utility system 100 to client device 216. Furthermore, microgrid controller 210 is configured to receive additional instructions from client device 216. Additionally, client device 216 is configured to access or update database 214 through microgrid controller 210. Client device 216 is configured to present the data from microgrid controller 210 to a user. In other embodiments, microgrid controller 210 includes a display unit (not shown) to display data directly to a user.

Figure 3:
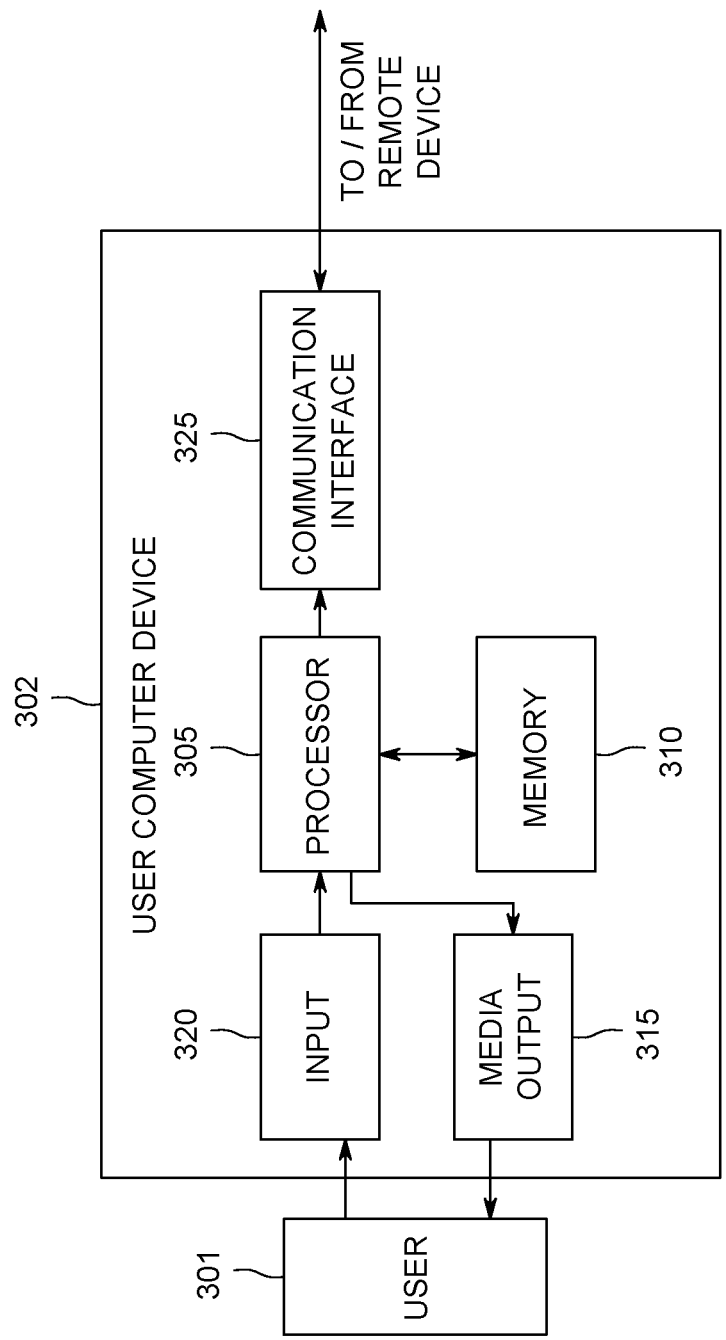
FIG. 3 is a schematic view of an exemplary configuration of a client device that may be used with the system shown in FIG. 2.

FIG. 3 is a schematic view of an exemplary configuration of client system 216 (shown in FIG. 2). A user computer device 302 is operated by a user 301. User computer device 302 may include, but is not limited to, power generator computer device 202, localized distribution devices 204, load computer devices 206, external grid computer device 208, and client systems 216 (all shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device facilitating information such as executable instructions and/or transaction data to be stored and retrieved. Memory area 310 includes one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, a dashboard for monitoring power flow and demand, a control screen for controlling operation of user computer device 302, and/or an update screen for updating software in user computer device 302. In some embodiments, user computer device 302 includes an input device 320 for receiving input from user 301. User 301 may use input device 320 to, without limitation, select and/or enter one or more sensor measurements to view. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as microgrid controller 210 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from microgrid controller 210. A client application facilitates user 301 to interact with, for example, fault detection computer device 210. For example, instructions may be stored by a cloud service and the output of the execution of the instructions sent to the media output component 315.

Figure 4:
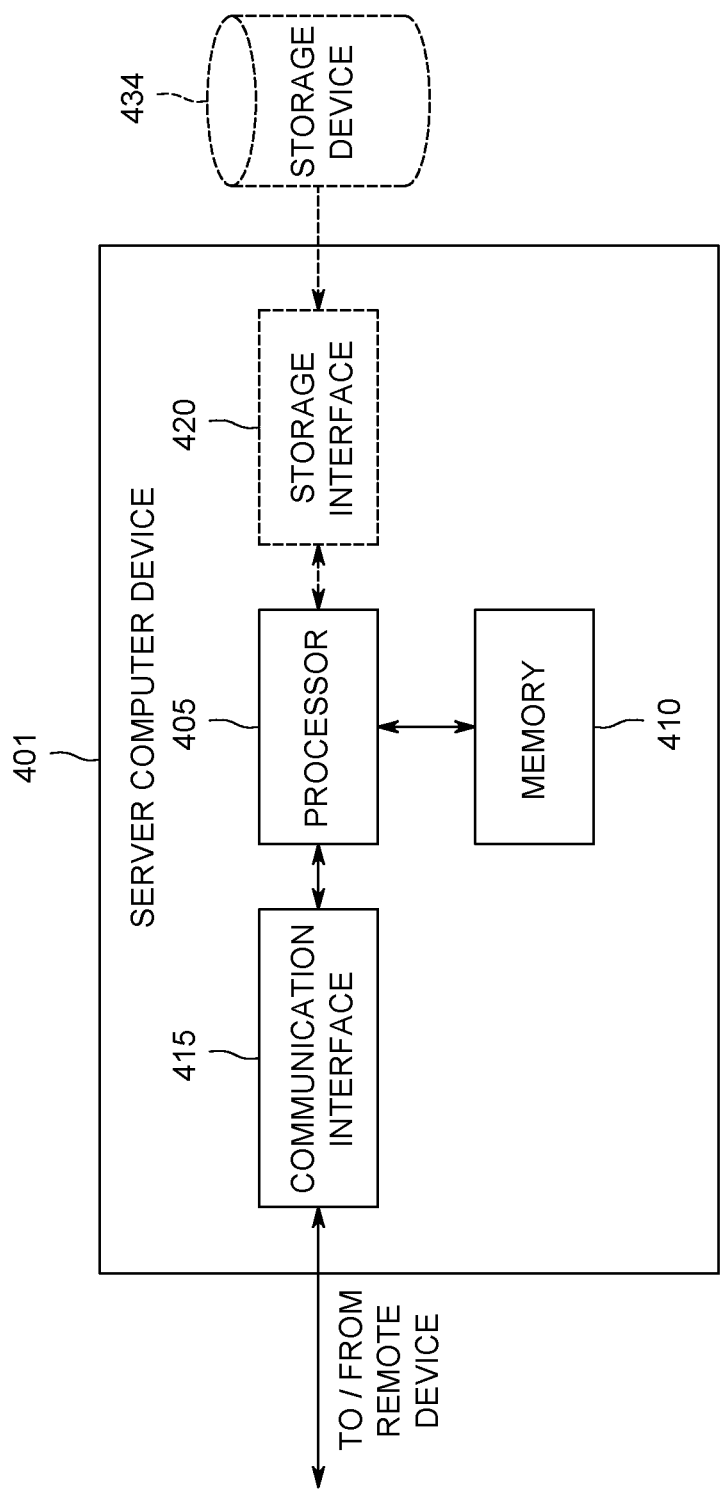
FIG. 4 is a schematic view of an exemplary configuration of a fault detection computer device that may be used with the system shown in FIG. 2.

FIG. 4 is a schematic view of an exemplary configuration of microgrid computer device 210 shown in FIG. 2, in accordance with one embodiment of the present disclosure. Server computer device 401 may include, but is not limited to, database server 212, microgrid computer device 210, power generator computer device 202, and external grid computer device 208 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 216, load computer devices 206, localized distribution devices 204 (all shown in FIG. 2), generator computer devices 202, external grid computer device 208. For example, communication interface 415 may receive requests from client systems 216 via the Internet.

Processor 405 may also be operatively coupled to a storage device 434. Storage device 434 is any computer-operated hardware suitable for storing and/or retrieving data, such as, but not limited to, data associated with database 214 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
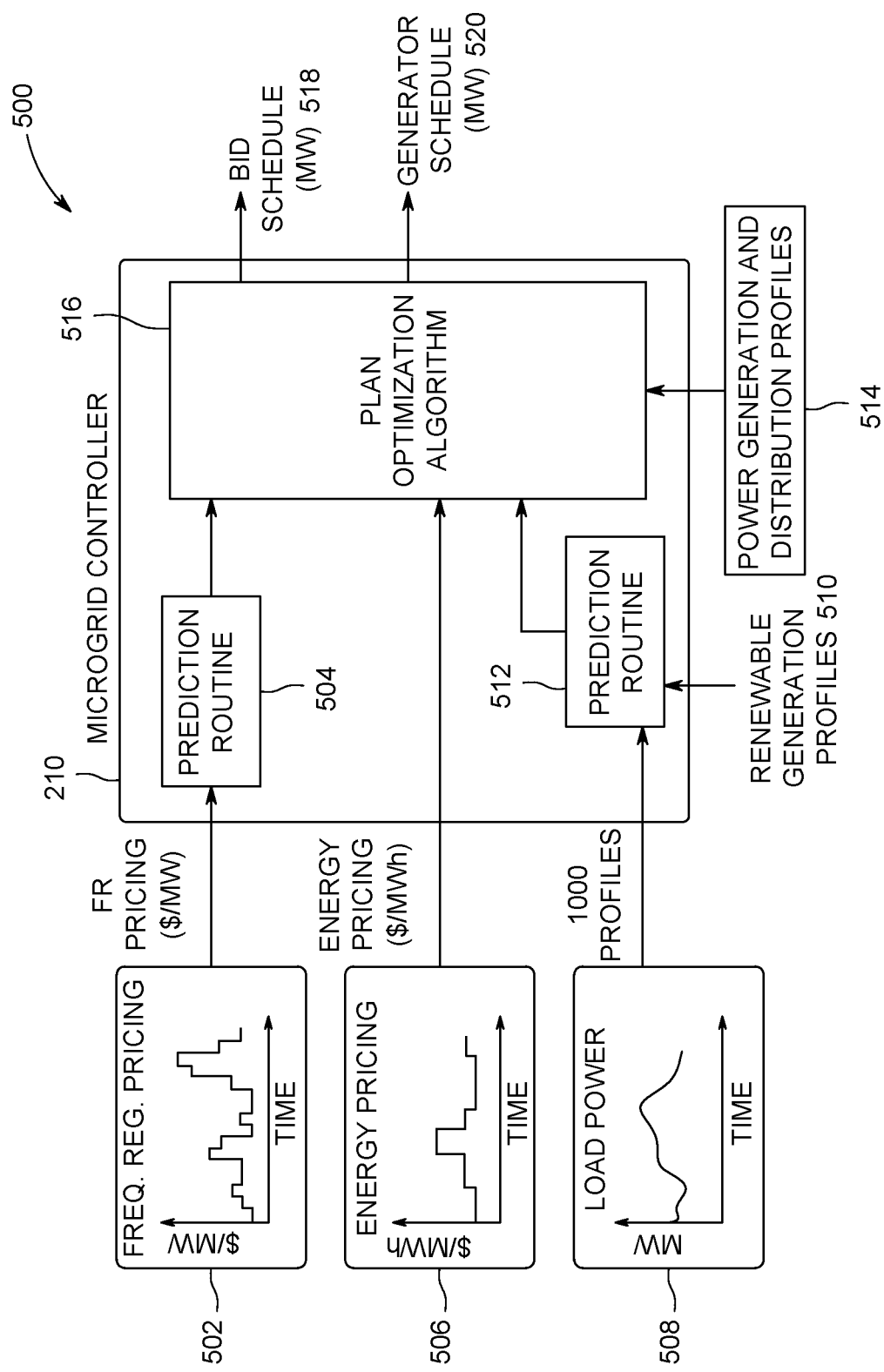
FIG. 5 is a block diagram of an exemplary process for regulating the microgrid utility system shown in FIG. 1.

FIG. 5 is a block diagram of an exemplary process 500 for regulating microgrid utility system 100 (shown in FIG. 1). Microgrid controller 210 receives frequency regulation pricing ("FRP") information 502. In the exemplary embodiment, FRP information 502 is historical data of pricing for frequency regulation services. In the U.S., the power grid is regulated to operate at a frequency of 60 HZ. If there is a gap between power generation and demand on the grid, then the grid frequency will move away from that value. This may induce malfunctions in different devices on the grid. Grid balancing for frequency regulation requires rapid responses to changes and variation in demand. In exchange for providing frequency regulation services, grid operators, such as those operating external grid 110 (shown in FIG. 1) will pay for frequency regulation services. In the exemplary embodiment, FRP information 502 includes historical information showing how much the grid operators have paid in the past per MW for frequency regulation services. FRP information 502 is used as inputs into a prediction routine 504 to determine how much external grid 110 (shown in FIG. 1) will pay for frequency regulation services in the future. In some embodiments, microgrid controller 210 receives FRP information 502 from external grid computer device 208 (shown in FIG. 2). In other embodiments, microgrid controller 210 stores FRP information 502 as it receives it in real-time from external grid computer device 208 in database 214 (shown in FIG. 2) for future use.

Microgrid controller 210 also receives energy pricing information 506 from external grid computer device 208. In the exemplary embodiment, external grid 110 provides a fixed schedule of the price of energy at different times. In the exemplary embodiment, energy pricing information 506 provides the amount per MW that the operators of external grid 110 are willing to pay and/or charge for energy. For example, the price of energy may be higher in the middle of the afternoon during the summer or at night during the winter. In the exemplary embodiment, the price for energy varies by the hour. In other embodiments, the price for energy may change at other intervals. In the exemplary embodiment, energy pricing information 506 facilitates microgrid controller 210 in predicting pricing over a predetermined interval of time, such as a 24 hour period.

Microgrid controller 210 also receives load power information 508. Load power information 508 represents the power demands of loads 106 (shown in FIG. 1) in microgrid utility system 100. In the exemplary embodiment, load power information 508 is historical information about past load demands that has been stored by microgrid controller 210 in database 214. In other embodiments, microgrid controller 210 receives load power information 508 from one or more load computer devices 206 (shown in FIG. 2). Load demand also has a temporal/season dependency described above.

Microgrid controller 210 also receives one or more renewable generation profiles 510. Some power generators 102 (shown in FIG. 1) may be based on renewable resources, such as solar cells and wind turbines. These power generators 102 may depend on the weather and other factors for their generation of power. In the exemplary embodiment, renewable generation profiles 510 include weather and other information that facilitate microgrid controller 210 in predicting the output of those power generators 102.

In the exemplary embodiment, microgrid controller 210 combines load power information 508 and renewable generation profiles 510 in a prediction routine 512 to determine a prediction of the amount of power, in excess of that produced by the renewable power generators 102, which will be required by microgrid utility system 100 to power loads 106.

Microgrid controller 210 also receives power generation and distribution profiles 514. Power generation and distribution profiles 514 include information on the operation of power generators 102 whose output can be directly controlled, such as diesel generators. The profiles 514 may include information such as, but not limited to, the cost of operation of one or more power generators 102 (i.e., fuel costs), a cost to ramp up in power of at least one of the one or more power generators 102, a time to ramp up in power of at least one of the one or more power generators, a cost to ramp down in power of at least one of the one or more power generators 102, and a time to ramp down in power of at least one of the one or more power generators 102. In the exemplary embodiment, ramp up stands for the amount of time to increase power generation by 1 kW. For example, some power generators 102 may be able to increase power output by 1 kW in a second or less than a second. Other power generators 102 may require a minute to increase power generation that much. Similarly, ramp down is the amount of time to reduce power output by 1 kW.

In the exemplary embodiment, microgrid controller 210 receives these profiles 514 from generator computer devices 202 (shown in FIG. 2) associated with power generators 102. In other embodiments, microgrid controller 210 receives these profiles from a client device 216. Power generation and distribution profiles 514 may also include information about the cost of transmitting energy through localized distribution network 104 (shown in FIG. 1). This information may include transmission losses and other constraints with routing electrical energy through localized distribution network 104 to loads 106 and external grid 110.

In the exemplary embodiment, microgrid controller 210 uses the energy pricing information 506, the load power information 508, the renewable generation profiles 510, and the power generation and distribution profiles 514 to determine a plan for power generation for a future 24 hour period, such as the next day. The plan uses as inputs the price of energy, the amount of energy expected to be required by the loads 106 during that time period, and the abilities of and costs to operate the various power generators 102 in microgrid utility system 100. In some situations, where the price of energy is low compared to the cost of generating energy, the plan may call for the microgrid utility system 100 to import energy from external grid 110. In situations where the price of energy is significantly higher than the cost of generating energy, the plan may call for the microgrid utility system 100 to generate more energy than needed for loads 106 to be able export electrical energy to external grid 110 for a profit. In the exemplary embodiment, microgrid controller 210 uses a plan optimization algorithm 516 to enhance the plan to maximize profit and minimize expenses on the behalf of microgrid utility system 100.

Using the plan, microgrid controller 210 generates a bid schedule 518 for external grid 110 and a generator schedule 520 for operation of power generators 102 during the time period. Microgrid controller 210 transmits bid schedule 518 to external grid computer device 208. Bid schedule 518 contains information on when microgrid utility system 100 is planning on transmitting electrical energy to external grid 110 and when microgrid utility system 100 is planning on receiving electrical energy from external grid 110. External grid computer device 208 replies with approval or denial of bid schedule 518. In some embodiments, external grid computer device 208 approves only portions of bid schedule 518. Generator schedule 520 is based on bid schedule 518 and microgrid controller 210 modifies generator schedule 520 based the response from external grid computer device 208. In the exemplary embodiment, microgrid controller 210 transmits generator schedule 520 to the power generator computer devices 202 associated with the one or more power generators 102 in microgrid utility system 100. Generator schedule 520 instructs power generator computer devices 202 in how to operate power generator 102 over the period of time contained in the plan.

In some embodiments, microgrid controller 210 generates bid schedule 518 based on FRP information 502. In these embodiments, bid schedule 518 includes the price per MW of energy that microgrid utility system 100 will provide to external grid 110 for the purposes of frequency regulation. In the exemplary embodiment, frequency regulation requires microgrid utility system 100 to provide energy to assist external grid 110 with frequency balancing in real-time, with minimal delay. In these embodiments, during execution of the generator schedule 520, microgrid controller 210 may receive requests, in real-time, from external grid computer device 208 to provide electrical energy to external grid 110 to regulate the frequency of external grid 110. Based on the received request, microgrid controller 210 instructs power generators 102 and localized distribution network 104 to provide the requested electrical energy to external grid 110. For example, one or more power generators 102 may be put in a standby-mode, where the power generators 102 may be able to ramp up rapidly to provide the requested electrical energy. An example power generator 102 for this service may be, but is not limited to, a battery storage device.

In one example, process 500 presented in FIG. 1 is configured to maximize microgrid utility system's expected profits (revenue−cost) by participation in a regulation market associated with external grid 110. In this embodiment, the exemplary cost function for real-time asset operation to provide frequency regulation is given as:

$$\min \Sigma_{t=0}^{T} C_{gen} + C_{chp} + C_{grid}, \quad \text{Eq. (1)}$$

where $C_{gen}$ is diesel generation cost (=fuel cost+startup cost), $C_{chp}$ is CHP cost (=fuel cost+startup cost), and $C_{grid}$ is grid buying expense or selling income. The modified cost function for the frequency regulation scheduling is given as:

$$\min \Sigma T_{t=0}^{T} C_{gen} + C_{grid} + C_{freq} - R_{freq}, \quad \text{Eq. (2)}$$

where $C_{freq}$ is the cost of providing frequency regulation and $R_{freq}$ is the revenue from providing frequency regulation.

In some geographic regions, frequency regulation is divided into up-regulation and down-regulation markets. In some of these regions, these markets are independent. In others, the markets are tied together. For the purposes of this example, these two markets are separate. Some example constraints for real-time asset operation include:

$$P_{g,min} \leq P_{g,i} \leq P_{g,max}, \quad \text{Eq. (3)}$$

$$RD\Delta t \leq P_{g,i+1} - P_{g,i} \leq RU\Delta t, \quad \text{Eq. (4)}$$

where Eq. 3 includes the power constraints, such that $P_{g,min}$ is the minimum amount of power generated and $P_{g,max}$ is the maximum amount of power generated and where $P_g$, is the actual power generated at by power generator i. And where Eq. 4 includes the ramp rate constraints, such that $RD\Delta t$ is the revenue from down frequency for $\Delta t$ and $RU\Delta t$ is the revenue from up frequency for delta t. The modified versions of these constraints can be shown as:

$$P_{g,min} \leq P_{g,i} + P_{r,i} \leq P_{g,max}, \quad \text{Eq. (5)}$$

$$RD\Delta t \leq (P_{g,i+1} - P_{g,i}) + (P_{r,i+1} - P_{r,i}) \leq RU\Delta t. \quad \text{Eq. (6)}$$

where $P_{r,i}$ is the amount of power generated by renewable energy source i.

The cost function for up-regulation vs. down-regulation is shown as:

$$\min \Sigma_{t=0}^{T} C_{gen} + C_{chp} + C_{grid} + \gamma * C_{freq} - R_{freq}, \quad \text{Eq. (7)}$$

where γ is a scalar representing the fraction of bid schedule 518 that is actually accepted.

The above algorithm acts as a microgrid aggregator to determine the optimal day-ahead energy and grid ancillary service schedules to bid to external grid 110 in order to maximize the profit. Further, the algorithm determines the power schedule for individual assets to simultaneously meet the microgrid's local energy demand as well as provide power output for grid ancillary services in a manner that maximizes the overall microgrid's profit (revenue−cost) over a 24-hour time horizon, while staying within the assets' limitations (e.g., asset power, ramp ratings). While the algorithm is focused on frequency regulation, the formula may also be adapted to extending to accommodate other grid services like spinning/non-spinning reserves, ramping reserves, and demand response.

Figure 6:
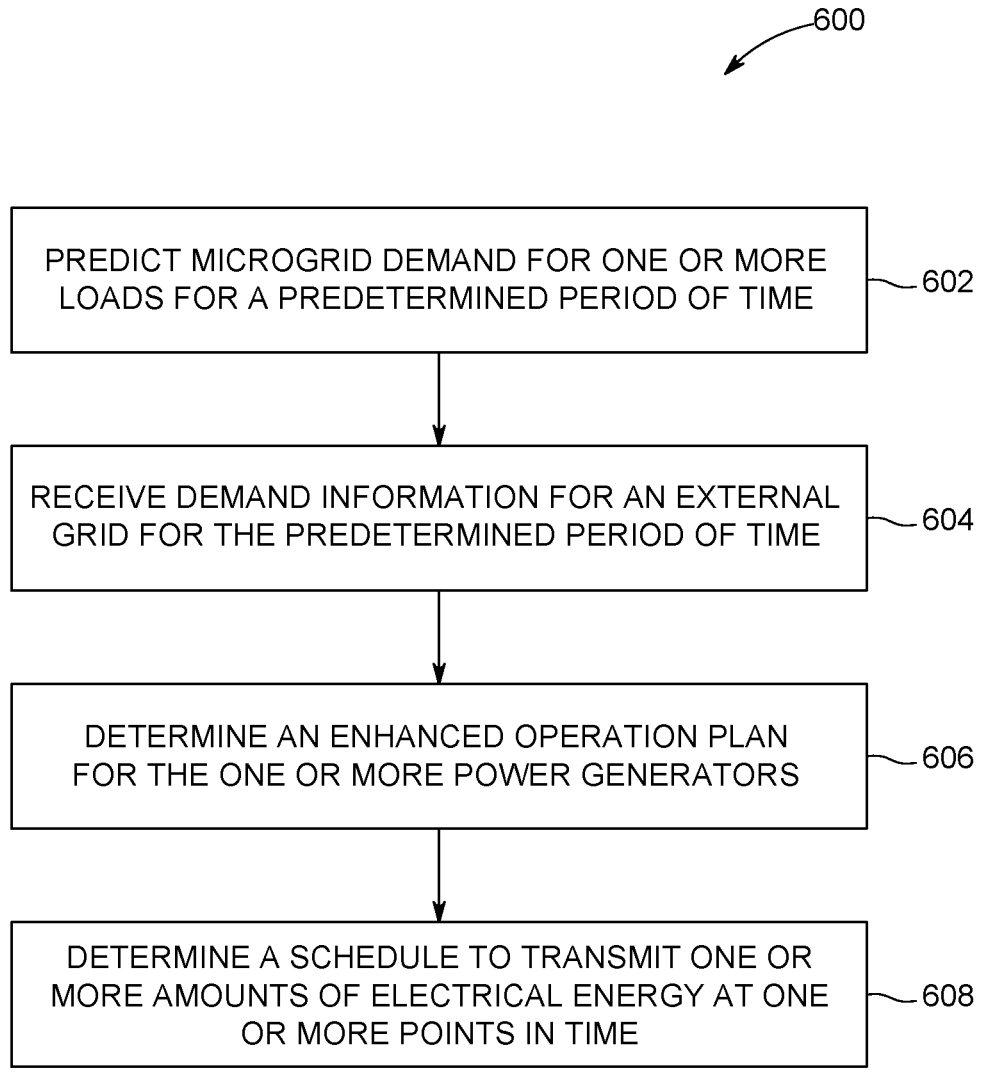
FIG. 6 is a flow chart of a process for regulating the microgrid utility system shown in FIG. 1 using the system shown in FIG. 2.

FIG. 6 is an exemplary flow chart of a process 600 for regulating microgrid utility system 100 (shown in FIG. 1) using system 200 (shown in FIG. 2). In the exemplary embodiment, process 600 is performed by microgrid controller 210 (shown in FIG. 2). In some embodiments, process 600 is a real-time process.

In the exemplary embodiment, microgrid controller 210 predicts 602 microgrid demand for one or more loads 106 (shown in FIG. 1) for a predetermined period of time. Microgrid demand is similar to load power information 508 (shown in FIG. 5) and represents the amounts of electrical energy each load 106 is expected to require over the period of time. In the exemplary embodiment, microgrid demand includes a plurality of power levels at a plurality of points in time during the predetermined period of time. For example, the microgrid demand may list out times and expected demand amounts at those times. In the exemplary embodiment, microgrid demand is generated based on historical load data stored in database 214 (shown in FIG. 2).

Microgrid controller 210 receives 604 demand information for external grid 110 (shown in FIG. 1) for the predetermined period of time. In the exemplary embodiment, demand information is similar energy pricing information 506 (shown in FIG. 5). In the exemplary embodiment, demand information includes information about the price of electrical energy at different points in time within the predetermined period of time. In some embodiments, demand information also include FRP information 502 (shown in FIG. 5). In the exemplary embodiment, microgrid controller 210 receives 604 the demand information from external grid computer device 208 (shown in FIG. 2). In the exemplary embodiment, the predetermined period is a 24 hour period, such as the next 24 hour day. In other embodiments, the predetermined period is any time period that facilitates the systems and methods described herein to function.

Microgrid controller 210 determines 606 an operation plan for the one or more power generators 102 (shown in FIG. 1) based on the demand information and the predicted microgrid demand. In the exemplary embodiment, microgrid controller 210 determines 606 a plan for operating each of the power generators 102 in microgrid utility system 100 based on the microgrid demand and the price of electrical energy set by external grid computer device 208. For example, if the price of electrical energy is lower than the cost to generate the electrical energy using one or more power generators 102, microgrid controller 210 may determine not to use the one or more power generators 102 and import the needed electrical energy from external grid 110. However, if the price of electrical energy is higher than the cost to generate the electrical energy using one or more power generators 102, microgrid controller 210 may determine to genereate, by the one or more power generators 102, electrical energy in excess of that needed based on the microgrid demand and export the needed electrical energy to external grid 110.

Microgrid controller 210 determines 608 a schedule to transmit electrical energy at one or more points in time to external grid 110. Based on the operation plan, microgrid controller 210 determines when to transmit electrical energy to external grid 110. In the exemplary embodiment, microgrid controller 210 transmits the schedule to external grid computer device 208 for approval. In the exemplary embodiment, external grid computer device 208 approves some or all of the schedule and transmits the reply back to microgrid controller 210.

In the exemplary embodiment, microgrid controller 210 transmits to the power generator computer devices 202 (shown in FIG. 2) the sections of the schedule corresponding to their associated power generator 102.

The above-described method and system provide for cost-effective regulation of a microgrid. Furthermore, the method and systems described herein facilitate improving the optimization of operation of the microgrid, while reducing costs and improving profitability. These methods and systems facilitate providing electrical energy and ancillary services to external power grids. Also, the system and methods described herein are not limited to any single type of system, utility, or power source, but may be implemented with any system or utility capable of contributing to an external power grid or utility system without being a directly controlled part of that utility. By predicting the future demand of loads on the local microgrid and those of external grids, system and method described herein facilitates the operators of local microgrids providing the needed resources of both in an economical and efficient manner.

An exemplary technical effect of the methods, systems, and apparatus described herein includes at least one of: (a) efficiently operating a microgrid in both island and connected modes; (b) reducing strain on system resources; (c) improving profitability of power generation in a microgrid; and (d) providing ancillary services to external power grids.

Exemplary embodiments of method and systems for regulating a microgrid are described above in detail. The method and systems described herein are not limited to the specific embodiments described herein, but rather, components of systems or steps of the methods may be utilized independently and separately from other components or steps described herein. For example, the methods may also be used in combination with different types of utilities associated with multiple different types of systems, and are not limited to practice with only the microgrid utility systems and ancillary services as described herein. Rather, the exemplary embodiments may be implemented and utilized in connection with many other systems, that may require regulation, be operated as described herein. In some other embodiments, the methods and systems described herein may be used with other ancillary services and any other type of utility generation system.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A microgrid system comprising:
   one or more power generators configured to provide electrical energy to one or more loads;
   a localized distribution network coupled to said one or more power generators, coupled to the one or more loads, and coupled to an external grid, wherein said localized distribution network is configured to transmit electrical energy; and
   a microgrid controller comprising a processor and a memory coupled to said processor, said microgrid controller in communication with said one or more power generators and in communication with the external grid, said microgrid controller configured to:
  predict microgrid demand for the one or more loads for a predetermined period of time;
  receive demand information for the external grid for the predetermined period of time, wherein the demand information includes pricing for frequency regulation services;
  determine an operation plan for the one or more power generators based on the predicted microgrid demand and the received demand information;
  determine a schedule to transmit electrical energy to the external grid based on the operation plan;
  wherein the operation plan is selected to minimize expenses and is based on a cost function:

$$\min \Sigma_{t=0}^{T} C_{gen} + C_{grid} + C_{freq} - R_{freq},$$

where $C_{gen}$ is diesel generation cost, $C_{grid}$ is grid buying expense or selling income, $C_{freq}$ is the cost of providing frequency regulation services and $R_{freq}$ is the revenue from providing frequency regulation services; and
  wherein a constraint for the cost function include $$RD\Delta t \leq P_{g,i+1} - P_{g,i} \leq RU\Delta t,$$

where $RD\Delta t$ is the revenue from down frequency for $\Delta t$, $RU\Delta t$ is the revenue from up frequency for $\Delta t$ and $P_{g,i}$ is the generated power.

2. The system in accordance with claim 1, wherein said microgrid controller is further configured to facilitate transmission of electrical energy from said one or more generators to the external grid in accordance with the schedule.

3. The system in accordance with claim 2, wherein said microgrid controller is further configured to:
  transmit, to a computer device associated with the external grid, the schedule;
  receive, from the computer device associated with the external grid, approval for the schedule; and
  facilitate transmission of electrical energy based on the received approval and the schedule.

4. The system in accordance with claim 1, wherein said microgrid controller is further configured to determine an amount of electrical energy to receive from the external grid at a point in time based on the operation plan.

5. The system in accordance with claim 1, wherein said microgrid controller is further configured to:
  store historical demand data for the plurality of loads; and
  predict the microgrid demand based on the historical demand data.

6. The system in accordance with claim 1, wherein the predetermined period of time is a 24 hour period subsequent to the current 24 hour period.

7. The system in accordance with claim 1, wherein the demand information includes pricing information for energy at a plurality of points in time during the predetermined period of time.

8. The system in accordance with claim 1, wherein the operation plan is further based on a cost of operation of said one or more generators, a cost to ramp up in power at least one of said one or more generators, a time to ramp up in power of at least one of said one or more generators, a cost to ramp down in power of at least one of said one or more generators, a time to ramp down in power at least one of said one or more generators, and a transmission loss.

9. The system in accordance with claim 1, wherein the operation plan is further based on providing at least one ancillary service, including, but not limited to, frequency regulation, operating reserves, spinning reserves, non-spinning reserves, ramping reserves, and demand response.

10. The system in accordance with claim 1, wherein said one or more generators, the one or more loads, and the localized distribution network form a local grid.

11. A computer-based method for regulating a microgrid, said method implemented using a microgrid controller including at least one processor in communication with a memory, said method comprising:
  predicting, by the microgrid controller, microgrid demand for one or more loads for a predetermined period of time;
  receiving demand information for an external grid for the predetermined period of time, wherein the demand information includes pricing for frequency regulation services;
  determining, by the microgrid controller, an operation plan of one or more power generators based on the predicted microgrid demand and the received demand information;
  determining, by the microgrid controller, a schedule to transmit electrical energy to the external grid based on the operation plan;
  wherein the operation plan is selected to minimize expenses and is based on a cost function:

$$\min \Sigma_{t=0}^{T} C_{gen} + C_{grid} + C_{freq} - R_{freq},$$

where $C_{gen}$ is diesel generation cost, $C_{grid}$ is grid buying expense or selling income, $C_{freq}$ is the cost of providing frequency regulation services and $R_{freq}$ is the revenue from providing frequency regulation services; and
  wherein a constraint for the cost function include $$RD\Delta t \leq P_{g,i+1} - P_{g,i} \leq RU\Delta t,$$

where $RD\Delta t$ is the revenue from down frequency for $\Delta t$, $RU\Delta t$ is the revenue from up frequency for $\Delta t$ and $P_{g,i}$ is the generated power.

12. The method in accordance with claim 11, further comprising facilitating transmission of electrical energy from said one or more generators to the external grid at the one or more points in time in accordance with the schedule.

13. The method in accordance with claim 12, further comprising:
  transmitting, to a computer device associated with the external grid, the schedule;
  receiving, from the computer device associated with the external grid, approval for the schedule; and
  facilitating transmission of the electrical energy based on the received approval and the schedule.

14. The method in accordance with claim 11, further comprising determining an amount of electrical energy to receive from the external grid at a point in time based on the operation plan.

15. The method in accordance with claim 11, further comprising:
  storing historical demand data for the plurality of loads; and
  predicting the microgrid demand based on the historical demand data.

16. A non-transitory computer readable medium configured to control a microgrid, the computer readable medium comprising one or more programmed instructions wherein when executed by a processor of a microgrid controller cause the microgrid controller to:
  predict microgrid demand for one or more loads for a predetermined period of time;

receive demand information for an external grid for the predetermined period of time, wherein the demand information includes pricing for frequency regulation services;

determine an operation plan of one or more power generators based on the predicted microgrid demand and the received demand information;

determine a schedule to transmit electrical energy to the external grid based on the operation plan;

wherein the operation plan is selected to minimize expenses and is based on a cost function:

$$\min \Sigma_{t=0}^{T} C_{gen} + C_{grid} + C_{freq} - R_{freq},$$

where $C_{gen}$ is diesel generation cost, $C_{grid}$ is grid buying expense or selling income, $C_{freq}$ is the cost of providing frequency regulation services and $R_{freq}$ is the revenue from providing frequency regulation services; and wherein a constraint for the cost function include $$RD\Delta t \leq P_{g,i+1} - P_{g,i} \leq RU\Delta t,$$

where $RD\Delta t$ is the revenue from down frequency for $\Delta t$, $RU\Delta t$ is the revenue from up frequency for $\Delta t$ and $P_{g,i}$ is the generated power.

17. The non-transitory computer readable medium of claim 16, wherein the processor-executable instructions cause the microgrid controller to facilitate transmission of electrical energy from said one or more generators to the external grid at the one or more points in time in accordance with the schedule.

18. The non-transitory computer readable medium of claim 17, wherein the processor-executable instructions cause the microgrid controller to:

transmit, to a computer device associated with the external grid, the schedule;

receive, from the computer device associated with the external grid, approval for the schedule; and facilitate transmission of the electrical energy based on the received approval and the schedule.

19. The non-transitory computer readable medium of claim 16, wherein the processor-executable instructions cause the microgrid controller to determine an amount of electrical energy to receive from the external grid at a point in time based on the operation plan.

20. The non-transitory computer readable medium of claim 16, wherein the processor-executable instructions cause the microgrid controller to:

store historical demand data for the plurality of loads; and predict the microgrid demand based on the historical demand data.

* * * * *